July 15, 1958    J. L. NELSON    2,842,926
COTTON TOPPER WITH HYDRAULIC ADJUSTING MEANS
Filed March 28, 1955    4 Sheets-Sheet 2
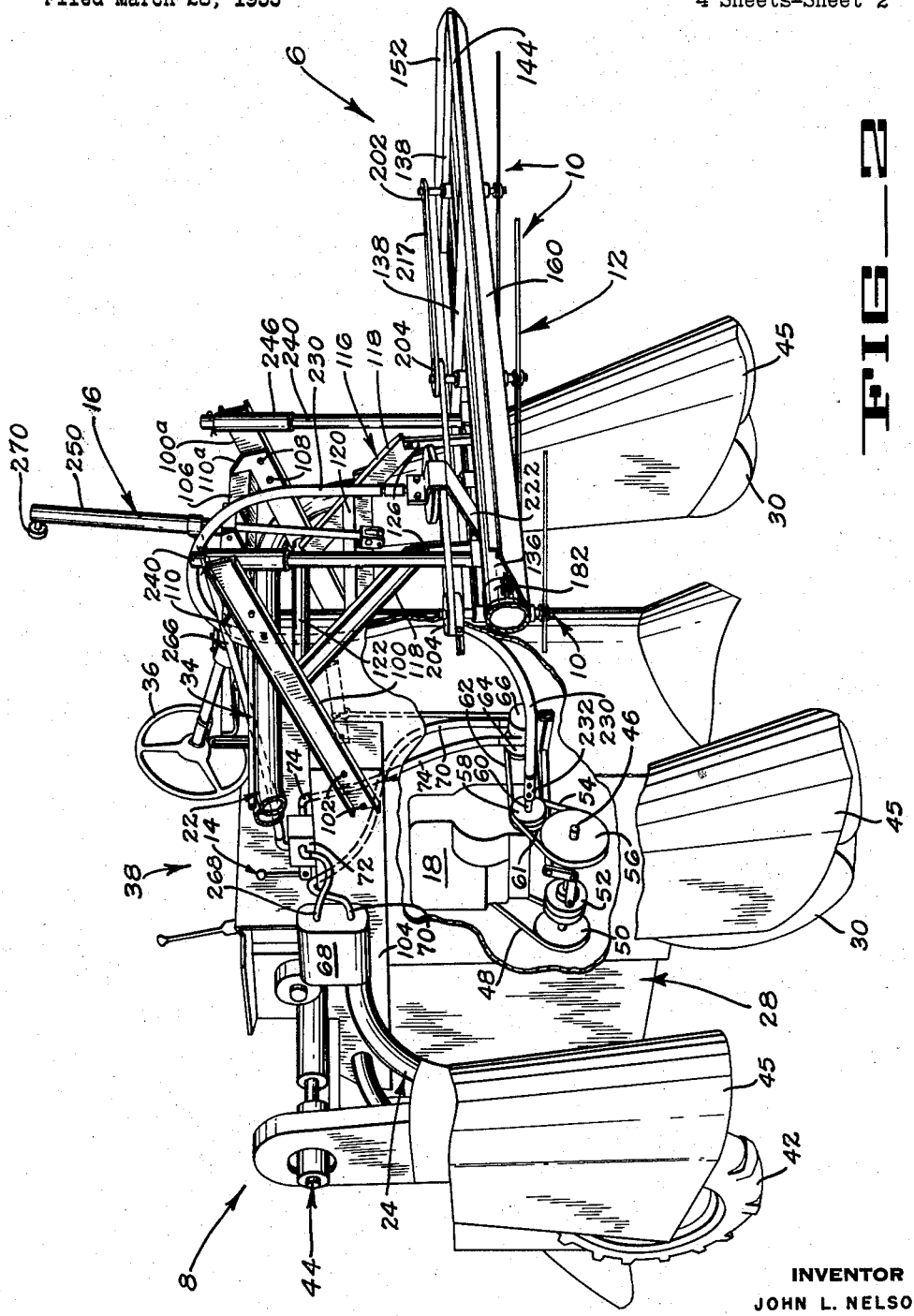
FIG_2
INVENTOR
JOHN L. NELSON
BY Hans G. Hoffmeister.
ATTORNEY

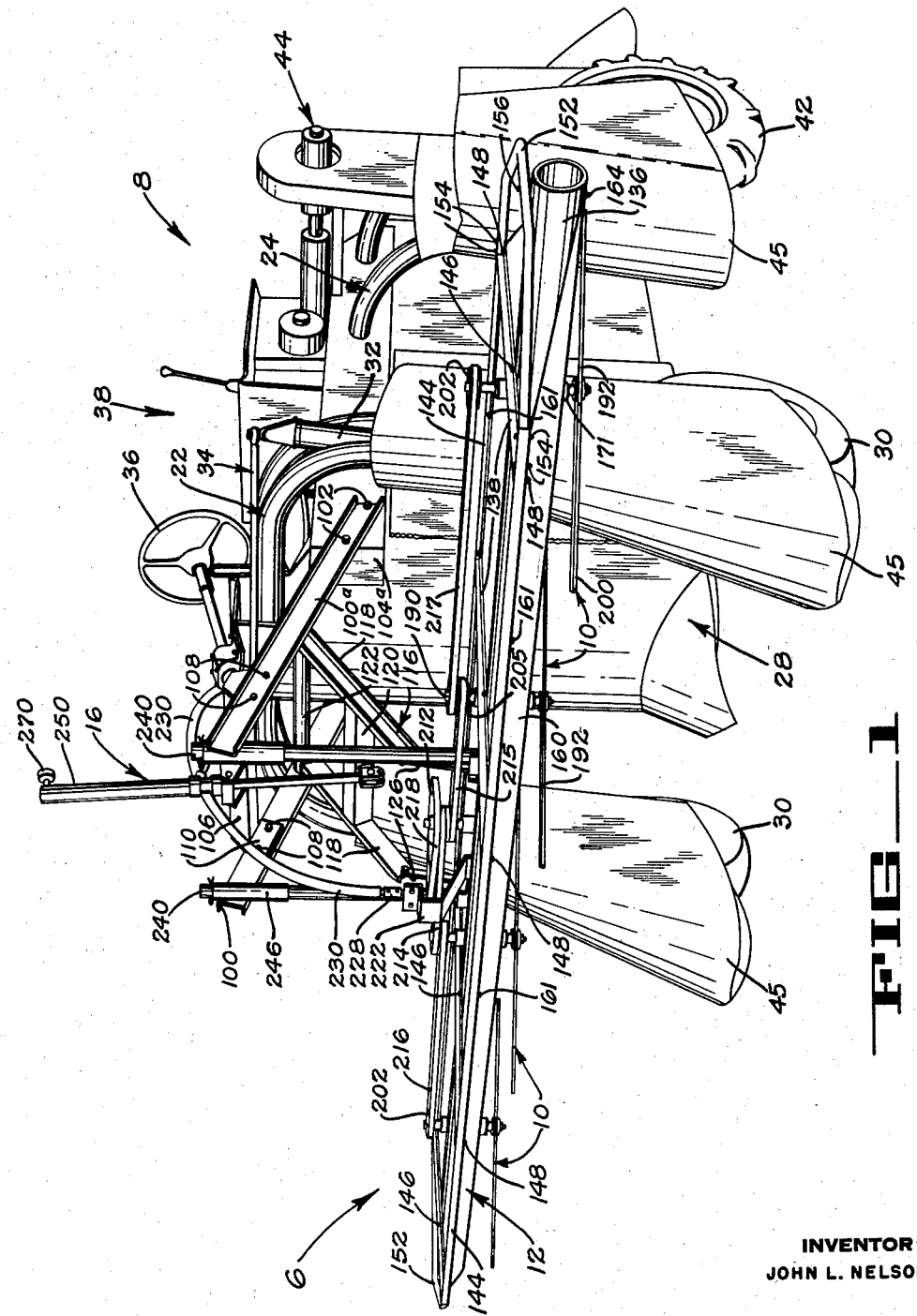

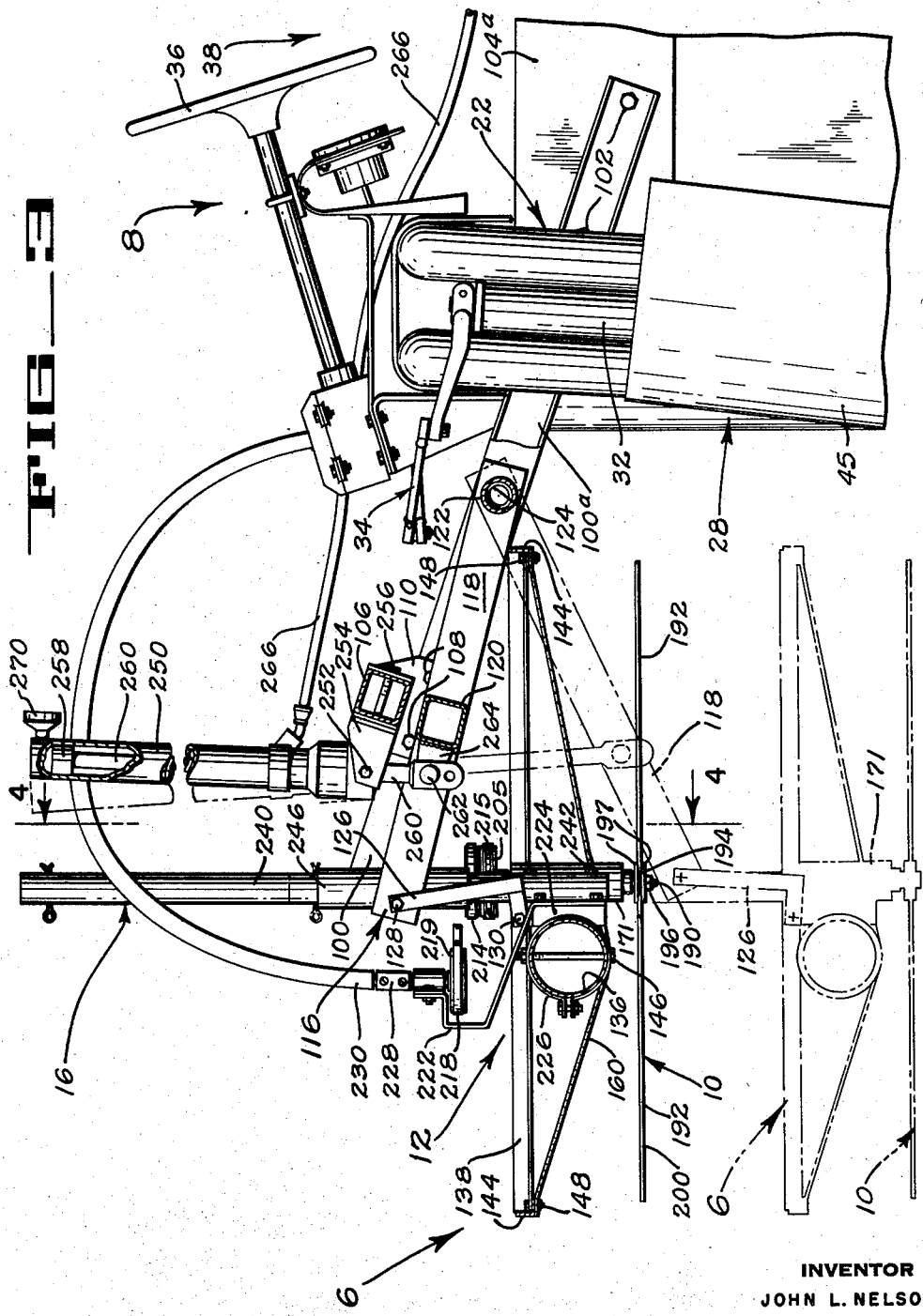

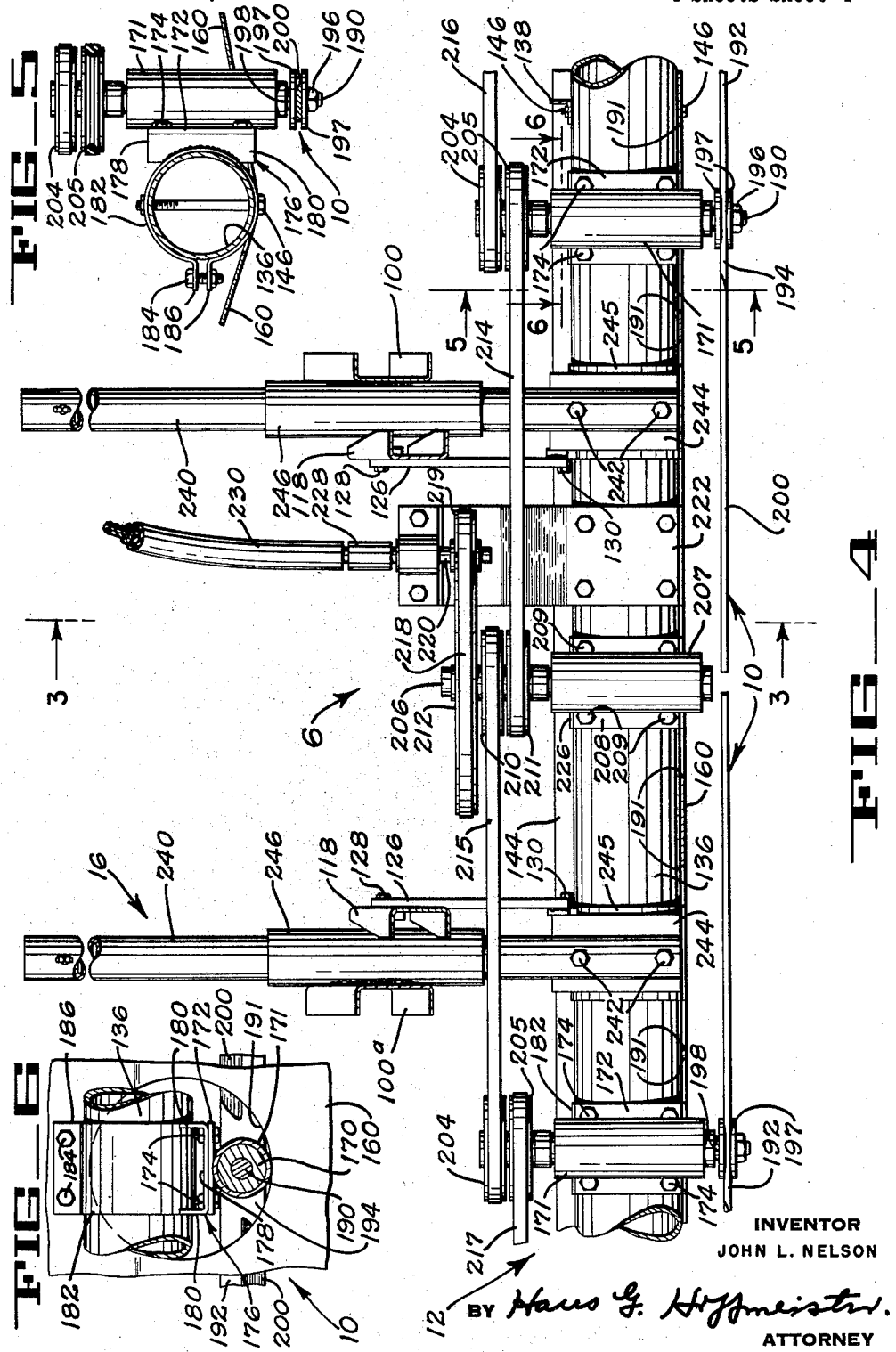

United States Patent Office 2,842,926
Patented July 15, 1958

2,842,926

COTTON TOPPER WITH HYDRAULIC ADJUSTING MEANS

John L. Nelson, San Jose, Calif., assignor to Food Machinery and Chemical Corporation, San Jose, Calif., a corporation of Delaware Application March 28, 1955, Serial No. 496,986

3 Claims. (Cl. 56—25.4)

This invention relates to mobile agricultural equipment and more particularly to self-propelled plant pruning apparatus.

The yield of cotton plants can be substantially increased by topping the plants during the early stages of their development, to remove the leaders in the upper portion of each plant. Such topping is conducive to the development of bushy, compact plants which blossom more heavily and thus produce a heavier crop than plants whose trunks and upper branch systems are permitted to develop naturally.

It is, therefore, an object of this invention to provide a machine for topping cotton plants.

Another object is to provide a cotton topping machine in the form of an attachment or accessory for a self-propelled agricultural machine, such as a tractor or plant spraying machine, whereby large acreages of young cotton plants can be topped rapidly and efficiently by a single operator.

Another object is to provide an adjustable cotton topping vehicle attachment which is constantly under the control of the vehicle operator who is thus enabled to regulate the topping operation in conformity with changing conditions in the field.

Another object is to provide an adjustable cotton topping attachment for a self-propelled vehicle, which is both operated and adjusted by power derived from the motor of the vehicle on which the attachment is mounted.

Another object is to provide a novel, inexpensive construction for the cutter-carrying frame of a cotton topping machine, which frame is inexpensive and light in weight, and yet is unusually rigid and sturdy.

Another object is to provide a novel and unusually efficient structure for supporting the cutter-carrying frame and for mounting the same upon a piece of self-propelled agricultural equipment.

Other objects and advantages of the present invention will become apparent from the following description and drawings, in which:

Fig. 1 is a front, left side perspective of the cotton topper of the present invention, operatively installed on a mobile cotton plant spraying machine.

Fig. 2 is a front, right side perspective of the cotton topper and spraying machine of Fig. 1, portions being broken away.

Fig. 3 is a reduced fragmentary side elevation of the spraying machine and a section of the topper attachment, taken along lines 3—3 of Fig. 4.

Fig. 4 is an enlarged fragmentary transverse section taken along lines 4—4 of Fig. 3.

Fig. 5 is a vertical section taken along lines 5—5 of Fig. 4.

Fig. 6 is a fragmentary horizontal section taken along lines 6—6 of Fig. 4.

The cotton topping apparatus of the invention indicated generally at 6 (Figs. 1–4) is adapted to be mounted on the chassis of a motor driven agricultural vehicle 8, to be advanced thereby along parallel rows of cotton plants, and is equipped with a plurality of cutters 10 which are arranged in a transverse series of sufficient lateral extent to engage the plants of several rows simultaneously. The cutters 10 operate in a common horizontal plane and are adapted to crop the leaders of the cotton plants extending upward beyond that plane. The cutters 10 are operably supported from a cutter frame 12 which is vertically adjustable in response to manipulation of a control member 14 (Fig. 2) accessible to the driver of the vehicle 8, so that as the apparatus approaches a group of plants differing in pruning requirements from those last pruned, the apparatus can readily be adjusted to meet the altered conditions without interrupting advance of the machine. Both the cutters 10 and the apparatus 16 for regulating height of the same, are operated by power derived from the motor 18 of the vehicle (Fig. 2).

The cotton topper 6 is applicable to any of several kinds of motor-driven agricultural vehicles. The requirements of a vehicle as far as suitability for reception of the cotton topping attachment of the invention is concerned, are that it be of a type adapted to be driven along the rows of cotton plants to be topped without seriously harming the plants and that it be equipped with a power take-off and a source of hydraulic fluid under pressure. In the accompanying drawings, the vehicle 8 on which the attachment 6 is mounted is a special, power driven, high clearance, plant spraying machine of the type disclosed in U. S. Patent No. 2,657,093, issued October 27, 1953, to J. B. Kucera. The vehicle 8 (Fig. 1) has high-arched front and rear frame portions 22 and 24, respectively, between which is suspended a body portion 28. The parts are so dimensioned that the body portion 28 is adapted to pass between two rows of cotton plants straddled and substantially cleared by the frame portions 22 and 24. Dirigible front wheels 30 are operably mounted on the lower ends of steering posts 32 carried by the front frame member 22 and connected by suitable linkage 34 to a steering wheel 36 conveniently accessible from the operator's station 38. The driving wheels 42 of the spraying machine 8 are operably mounted on the rear frame portion 24, and are connected by a suitable drive mechanism 44 to the motor 18 (Fig. 2). The forward portion of each wheel 30 and 42 is loosely enclosed within an upwardly and rearwardly inclined shield 45 adapted to protect branches and foliage of plants by lifting them out of the path of the wheel. A countershaft 46 (Fig. 2) is driven from the main shaft (not shown) of the motor 18 by a belt 48 and a pulley 50, and is connected through a clutch 52, belt 54 and pulleys 56 and 58, to a power take-off 60. Rigid with the pulley 58 is another pulley 61 which is connected by a belt 62 to the drive pulley 64 of a pump 66 adapted to draw hydraulic fluid from a supply reservoir 68 through a conduit 70. The pump 66 is adapted to supply fluid under pressure to a three-way diverter valve 72 through a conduit 74, and the control member 14 hereinabove referred to is the handle of the valve 72.

The cotton topper attachment 6 of the present invention is mounted on the plant spraying machine 8 by means of a pair of booms 100 and 100a (Figs. 1, 2 and 3) each of which is a suitable length of channel section angle iron. The booms 100 and 100a are rigidly and preferably removably attached by bolts 102 (Fig. 3) to side frame members 104 and 104a of the body portion 28 of the spraying machine. The frame members 104 and 104a are mounted adjacent the top of the body portion 28, and the booms 100 and 100a are disposed in parallel relation, sloping upward and forward from the front end of the spraying machine 8, so that the distal ends of the booms are at a considerable height above the ground in front of the spraying machine 8. A transverse brace 106 rigidly interconnects the booms 100 and 100a, to which it is rigidly secured by bolts 108 (Fig. 3) extending through flanges 110 and 110a (Fig. 2) at the ends of the brace.

An H-shaped frame 116 (Figs. 1, 2 and 3) comprising spaced, parallel, longitudinally extending arms 118 rigidly interconnected by transverse braces 120 and 122, is pivoted to and between the booms 100 and 100a. For this purpose, the brace 122 at the rear end of the frame 116 is a tubular shaft, the ends of which extend beyond the arms 118 to provide hollow trunnions (not shown) rotatably seated on bearings 124 (Fig. 3) secured to the inner faces of the booms 100 and 100a adjacent the front end of the spraying machine body 28. The cutter frame 12 is suspended from the forward ends of the arms 118 by L-shaped links 126, each of which is pivoted at its upper end to one of the arms by a bolt 128 (Fig. 4) and at its lower end to the frame 12 by a bolt 130.

In accordance with the present invention, the cutter frame 12 (Figs. 1 and 4) comprises a transversely extending strongback 136 in the form of a suitable length of tubing of relatively large diameter. A plurality of longitudinal ribs 138 of angle section are secured by bolts 146 to the upper side of the strongback 136. The ribs 138 are perpendicular to, and are spaced at substantially equal intervals along, the strongback 136, and are disposed in a common horizontal plane.

The front and back edges of the frame 12 (Fig. 3) are defined by rails 144 of angle section, and are secured to the ribs 138 by bolts 148. The sides of the frame 12 (Fig. 1) are defined by rails 152 of generally U-shaped configuration and are attached at their ends to the ends of the front and back rails 144 by bolts 154. The mid-sections of the side rails 152 are supported on, and are secured by bolts 156 to, the ends of the strongback 136, which project beyond the outermost ribs 138.

A sheet metal deflector plate 160 is secured to the under surface of the cutter frame 12. As shown in Fig. 3, the front and back edges of the plate 160 are attached to the front and back rails 144, respectively, by the bolts 148 which secure the rails 144 to the ribs 138, and by additional bolts 161 (Fig. 1) between the ribs 138. The forward portion of the plate 160 (Fig. 3) inclines downward and rearward from the front rail 144 to the lower side of the stronkback, where the plate 160 is flexed sufficiently for the after portion of the plate to slope upward and rearward to the back rail 144. The side edges 162 of the deflector plate 160 (Fig. 1) are shaped to substantially conform to the U-shaped side rails 152 of the frame 12 and are secured to the under side of the strongback 136 adjacent the ends of the same, by bolts 164.

Four bearings 170 (Fig. 6) are carried by the frame 12 in an equally spaced transversely extending series. Each bearing 170 is enclosed within a tubular bearing housing 171 (Figs. 1, 4, 5 and 6) which has a flat plate 172 welded to one side thereof, and the plate 172 is secured by bolts 174 to a mounting saddle 176 comprising a plate 178, the end portions of which are bent to extend at ninety degrees from the intermediate portion of the plate to present two spaced legs 180 (Fig. 6). The distal ends of the legs 180 are arcuately concave (Fig. 5) to conform to the cylindrical surface of the strongback 136. A strap 182 welded to and conforming to the curvature of the concave ends of the legs 180, embraces the strongback 136 and is adapted to be securely clamped thereon by bolts 184 extending through flanges 186 formed by the out-turned ends of the strap.

A shaft 190 is journalled in each of the bearings 170; and since the bearings 170 extend downward through openings 191 (Figs. 4, 5 and 6) provided therefor in the deflector plate 160, the cutters 10, one of which is secured to the lower end of each shaft 190, are disposed in operative position below the deflector plate.

Each of the cutters 10 (Fig. 4) comprises two blades 192 extending radially and oppositely from a central hub 194 secured to the associated shaft 190 by a nut 196, which when tightened, clamps the hub 194 between washers 197, a shoulder 198 being provided on the shaft 190 for engagement by the upper washer 197. The edge of each blade 192 which leads when the cutter 10 is rotated, is sharpened to a cutting edge 200.

As best shown in Fig. 1, each of the two outer shafts 190 has a single pulley 202 affixed to the upper end thereof. Each of the inner shafts 190 carries two pulleys 204 and 205, respectively, (Fig. 4). Substantially midway between the two inner shafts 190, a jack shaft 206 is journalled in a bearing (not shown) carried within a housing 207. This bearing housing 207 is mounted on the strongback 136 by a plate 208 welded to the housing and affixed by bolts 209 to a saddle and clamping strap that are not shown but are substantially identical to the saddles 176 and clamping straps 182 by which the bearing housings 171 are mounted on the strongback 136. Two driving pulleys 210 and 211 (Fig. 4) and a larger driven pulley 212 are rigidly secured to the jack shaft 206. One of the inner shafts 190 is driven by a belt 214 trained around the pulley 205 thereon and around the driving pulley 211, and the other inner shaft 190 is driven by a belt 215 trained around the other driving pulley 210 and the pulley 204 on the said inner shaft 190. The two outer shafts 190 are driven by belts 216 and 217, respectively, each of which is trained around the associated pulley 202 and around one of the pulleys on the associated inner shaft 190.

The jack shaft 206 is driven by a belt 218 trained around the driven pulley 212 and around a drive pulley 219 (Figs. 3 and 4) that is secured to a stub shaft 220. The stub shaft 220 and the pulley 219 are rotatably supported by an S-shaped bracket 222 that is rigidly mounted on the strongback 136 by means of a saddle 224 and clamping strap 226 which likewise are substantially identical to the saddles 176 and clamping straps 182. The stub shaft 220 is connected by a coupling 228 to one end of a flexible drive cable 230, whose other end is connected by a coupling 232 (Fig. 2) to the power take-off 60 of the spraying machine 8 to be driven thereby.

A pair of transversely spaced guide rods 240 are mounted on the strongback 136 by bolts 242 (Fig. 4) extending through the lower ends of the guide rods into engagement with saddles 244 (Fig. 4) affixed to the strongback 136 by clamps 245. Here again, the saddle and clamp are substantially identical to the saddles 176 and clamping straps 182. In addition to providing the means for mounting the guide rods 240, the saddles 244 likewise serve to connect the supporting links 126 to the cutter frame 12, since it is these saddles to which the pivot bolts 130 are connected.

Each of the rods 240 extends upward from the strongback 136 and slidably through a tubular guide 246 welded in vertical position to the associated boom 100, 100a. Since the rods 240 are rigid with the strongback 136, they and the guide tubes 246 cooperate to retain the frame 12 horizontal, and to guide the frame 12 in rectilinear vertical movement.

The apparatus 16 for regulating the height of the cutter frame 12 comprises a hydraulic cylinder 250 (Fig. 3) pivotally connected by trunnions 252, to a bracket 254 rigidly attached by a bolt 256 to the transverse brace 106 by which the booms 100 and 100a are interconnected. A plunger 258 is reciprocable within the cylinder 250, and the rod 260 of the plunger is pivotally connected by a wrist pin 262 to a bracket 264 rigid with the brace 120 that interconnects the arms 118 of the H-frame 116. A conduit 266 leading from the diverter valve 72 communicates with the cylinder 250 below the plunger.

The diverter valve 72, which is of conventional construction, is spring urged to a neutral setting wherein fluid from the pump 66 is by-passed through a conduit 268 back to the reservoir 68, and wherein flow is prevented in either direction through the conduit 266. Therefore, when the handle 14 of the valve 72 is in neutral position, the plunger 258 and the cutter frame 12 supported thereby are held stationary. When the handle 14 is moved to one side of its neutral position, communication is maintained between the pump 66 and the by-pass conduit 268, but communication is established between the conduit 266 and the by-pass conduit 268, thus relieving pressure within the cylinder 250 below the plunger 258, which permits the plunger and the cutter frame 12 to move downward by gravity. Placing the handle 14 at the other side of its neutral position closes off the by-pass conduit 268 and places the conduit 266 in communication with the conduit 74 so that fluid under pressure from the pump 66 is supplied to the cylinder 250 to lift the plunger 258 and the cutter frame 12.

Freedom of movement of the plunger 258 within the cylinder 250 is promoted by a vent hole (not shown) in an upper portion of the cylinder 250, which establishes communication between the atmosphere and the interior of the cylinder through a conventional air cleaner 270.

When the spraying machine 8 with the cotton topper attachment 6 mounted thereon is being moved about and the topping attachment 6 is not being operated, it is preferable that the cutter frame 12 be disposed in its highest position as illustrated in full lines in Fig. 3. In this manner, the greatest clearance is established for the cutter frame 12 and the cutters 10, thus minimizing danger of striking objects on the ground over which the cutter frame must be moved when approaching a field where cotton plants are to be topped or when leaving the field upon completion of a cotton topping operation. Moreover, the clutch 52 should be disengaged so as to permit the cutter blades 192 and the pump 66 to remain idle during such maneuvering of the vehicle 8. Upon arrival at a location near the spot where the cotton topping operation is to be started, the vehicle 8 should be stopped and its motor 18 slowed to idling speed, whereupon the clutch 52 should be engaged, causing the cutters 10 to rotate and the pump 66 to be operated.

The operator should then lower the cutter frame 12 to the position wherein the rotating cutters 10 are disposed at the height above the ground to which it is desired to prune the cotton plants in the part of the field where the topping operation is to be started. Such adjustment of the frame 12 to the desired elevation is accomplished by shifting the valve handle 14 to the position wherein communication is established between the cylinder supply conduit 266 and the by-pass conduit. This relieves the pressure imposed on the under surface of the plunger 258, and thus permits the plunger and the cutter frame 12 to move downward under the influence of gravity. Upon arrival of the cutter frame 12 at the desired elevation, as indicated in broken lines in Fig. 3, the operator should return the valve handle 14 to its neutral position. This prevents further flow of fluid from the cylinder 250, and thus effects retention of the frame 12 and cutters 10 in their newly attained vertical adjustment.

The operator should drive the vehicle into and across the field of cotton plants with the body portion 28 of the vehicle passing between adjacent rows of the plants. This causes each front wheel 30 and the associated rear wheel 42 to pass between the two plant rows at the associated side of the body portion, i. e. with the frame members 22 and 24 straddling two adjacent rows of cotton plants. Since the cutter frame 12 is substantially wider than the vehicle 8, the frame extends over the plant rows at both sides of the rows straddled by the frame members, with the result that while the two inner cutters 10 crop the tops of plants within the two inner rows, the two outer cutters 10 perform a corresponding operation on the plants of two additional rows. Therefore, as the machine traverses the field, it effectually cuts back the tops of four rows of plants to a uniform height determined by the vertical adjustment to the cutter frame 12.

The frame 12 is maintained substantially horizontal, and the cutters 10 are thereby caused to operate at all times in a horizontal plane by the guide rods 240 and the guide tubes 246 through which the rods 240 slide while the cutter frame is being moved up and down. Moreover, the center-to-center spacing of the cutter shafts 190 is only slightly greater than the radius of the circular paths of the cutters, leaving only a narrow space between the swaths cut by adjacent cutters. This substantially eliminates the possibility that any plant parts extending above the plane in which the cutters 10 operate, will escape being cut back to that plane.

When the operator observes that he is approaching a portion of the field where the condition of the plants is such that they should be topped to a different height, he can readily raise or lower the cutter frame 12 by appropriate manipulation of the valve handle 14 as hereinabove explained, to effect raising or lowering the cutters 10 to meet the altered topping requirements. Such adjustment of the cutter frame 12 and the topping cutters 10 can be accomplished without interrupting advance of the vehicle 8, since the control handle 14 for the hydraulic elevating apparatus 16 is operable independently of the vehicle drive mechanism.

The deflector plate 160 effectively shields the operator of the vehicle 8 from injury by flying plant parts, by intercepting parts of the cotton plants that have been cut off and thrown upward by the rapidly rotating cutters. A large percentage of the severed plant parts thus intercepted by the deflector plate fall back into the range of operation of the cutters 10, which chop them into smaller pieces better suited for mulching.

While a preferred apparatus for carrying out the invention has been shown and described herein, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired, is:

1. A cotton topper attachment for an agricultural vehicle including a chassis, a motor mounted thereon, a power take-off driven by the motor, and a source of fluid under pressure, said attachment comprising a pair of booms, means for rigidly attaching the booms to the chassis in transversely spaced relation projecting from an end of the vehicle, a support frame including a shaft, transversely spaced arms extending radially from the shaft in a common plane, and a brace rigidly interconnecting the arms and spaced from the shaft, means rotatably mounting the shaft on the booms, a second brace rigidly interconnecting the booms, a cylinder pivotally mounted on one of said braces, a plunger reciprocable in said cylinder and pivotally connected to the other of said braces, a conduit including a control valve communicating with said cylinder, means for connecting the conduit with the source of fluid under pressure on the vehicle, a plurality of transversely spaced links pivoted to the support frame, a cutter frame pivotally suspended from said links, a plurality of transversely spaced vertical bearings carried by the cutter frame, a shaft journalled in each of the bearings, a cutter blade carried by each shaft below the frame, drive means coupled in driving engagement with said shaft and mounted on said cutter frame for movement therewith, and means including a flexible drive cable for operably connecting the drive means to the power take-off of the vehicle to be rotated thereby.

2. A cotton topper attachment for an agricultural vehicle including a chassis, a motor mounted thereon, a power take-off driven by the motor, and a source of fluid under pressure, said attachment comprising a pair of booms, means for rigidly attaching the booms to the chassis in transversely spaced relation projecting from an end of the vehicle, a support frame including a shaft, transversely spaced arms extending radially from the shaft in a common plane, and a brace rigidly interconnecting the arms and spaced from the shaft, means rotatably mounting the shaft on the booms, a second brace rigidly interconnecting the booms, a cylinder pivotally mounted on one of said braces, a plunger reciprocable in said cylinder and pivotally connected to the other of said braces, a conduit including a control valve communicating with said cylinder, means for connecting the conduit with the source of fluid under pressure on the vehicle, a plurality of transversely spaced links pivoted to the support frame, a cutter frame pivotally suspended from the links and including an elongated transversely extending tubular strongback, a plurality of laterally spaced ribs rigidly secured to the strongback and a shield rigidly secured to the strongback and the ribs, a plurality of transversely spaced vertical bearings mounted on the strongback, a shaft journalled in each of the bearings and extending through the shield, a cutter blade carried by each shaft below the shield and means for operably connecting all of said shafts to the power take-off of the vehicle to actuate the cutter blades.

3. A cotton topper attachment for an agricultural vehicle including a chassis, a motor mounted thereon, and an hydraulic pump operatively connected to the motor to be driven thereby, said attachment comprising a pair of booms, means for rigidly securing the booms to the chassis in transversely spaced relation projecting from an end of the vehicle, a brace rigidly interconnecting the booms, a shaft interconnecting the booms, means rotatably mounting the shaft on the booms, an H-shaped support frame pivotally mounted on said shaft, said H-frame comprising a pair of parallel arms positioned between said booms and a transverse brace spaced from said shaft, an hydraulic lift mechanism including a cylinder pivotally mounted on the brace interconnecting said booms, a plunger in said hydraulic lift reciprocable in said cylinder and pivotally connected to the brace of said H-frame, a conduit including a control valve communicating with said cylinder, means for connecting the conduit with said hydraulic pump, whereby operation of said hydraulic lift causes movement of said plunger to impart pivotal movement to said H-frame about said shaft, a link connected to each arm of said H-frame, a cutter frame pivotally suspended from said links, a guide tube rigidly secured to each of said booms, and a guide rod slidably engaged within each of said tubes and being rigidly secured to said cutter frame to maintain said cutter frame horizontal, said rods being adjustably positioned in said tubes in response to the pivotal movement of said H-frame in variably positioning said cutter frame.

References Cited in the file of this patent
UNITED STATES PATENTS

| | | |
|---|---|---|
| 2,161,357 | Kaplan | June 6, 1939 |
| 2,309,635 | Edwards | Feb. 2, 1943 |
| 2,328,838 | Oberlink | Sept. 7, 1943 |
| 2,483,683 | Wells et al. | Oct. 4, 1949 |
| 2,484,201 | Winchell | Oct. 11, 1949 |
| 2,498,138 | Shepard et al. | Feb. 21, 1950 |
| 2,681,536 | Kuhary et al. | June 22, 1954 |
| 2,682,740 | Miller et al. | July 6, 1954 |
| 2,706,879 | Barrentine | Apr. 26, 1955 |